No. 814,608. PATENTED MAR. 6, 1906.
J. E. JOHNSON.
HOSE CLAMP.
APPLICATION FILED MAR. 28, 1905.

WITNESSES:
C. E. Duffey
Amos W. Hart

John E. Johnson
BY Munn & Co.
ATTORNEYS

UNITED STATES PATENT OFFICE.

JOHN EDWARD JOHNSON, OF NEW PAYNESVILLE, MINNESOTA, ASSIGNOR OF ONE-THIRD TO JOHAN MARTIN DALHAUG, OF NEW PAYNESVILLE, MINNESOTA.

HOSE-CLAMP.

No. 814,808.	Specification of Letters Patent.	Patented March 6, 1906.

Application filed March 28, 1905. Serial No. 252,534.

*To all whom it may concern:*

Be it known that I, JOHN EDWARD JOHNSON, a citizen of the United States, and a resident of New Paynesville, in the county of Stearns and State of Minnesota, have invented an Improved Hose-Clamp, of which the following is a specification.

The invention is an improvement in that class of hose-clamps that comprise a band and a pivoted cam, which is permanently secured to one end of said band and adapted for detachable engagement with the other, the construction being such that in the closed position the cam holds the band drawn tightly around the hose.

The details of construction and combination of parts are as hereinafter described with reference to the accompanying drawings, in which—

Figure 1:
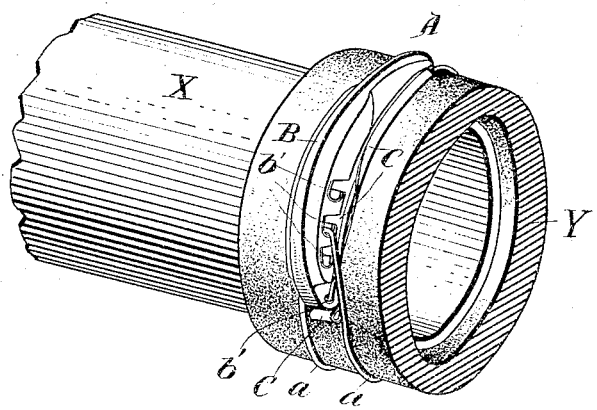
Figure 2:
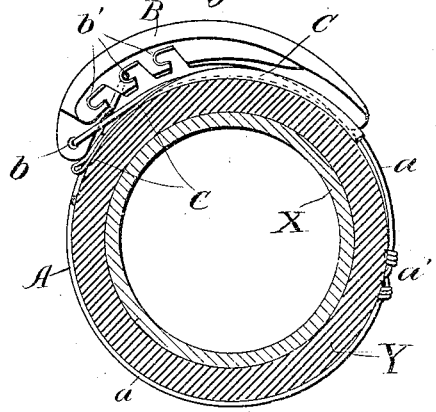
Figure 3:
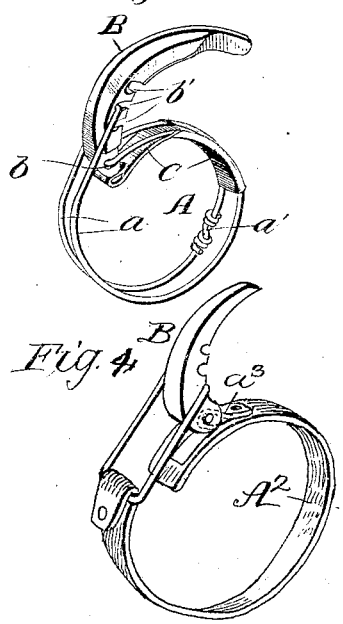
Figure 4:
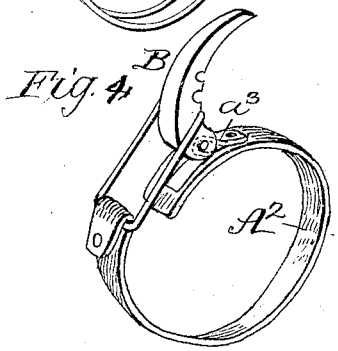

Figure 1 is a perspective view showing my improved clamp applied as in use. Fig. 2 is a transverse section of the flexible hose and metal pipe with my clamp applied. Fig. 3 is a perspective view showing the clamp in an open position. Fig. 4 is a view representing a modified form of the clamp.

X indicates a metal pipe, and Y a flexible hose applied thereto, the end of the metal pipe being inserted therein.

The main parts of the clamp are a tie A and a lever B. The tie is composed of a flexible wire or wires having great tensile strength. It is preferably produced from a single piece of wire, the same being looped at two points, so as to form parallel bights or strands $a$, the ends of the wire being united at $a'$. One end of the double or two-strand tie thus formed is pivotally connected with one end of the lever, as at $b$, and the other end is free, but adapted for attachment to the lever B at a point beyond its fulcrum, as indicated at $b'$, Fig. 2—that is to say, the tie is made of such length that it will extend around the hose Y and beyond the fulcrum $b$ of the lever when the same is closed, as in Figs. 1, 2—and it is detachably connected with the lever by means of a hook formed in the inner side of the lever, as shown. In order to adapt the clamp for application to hose and pipes of varying diameters, provision is made for adjustment of the practical length of the tie by a series of hooks $b'$, the same being arranged in alinement and formed integral with the lever. The latter has a curvature corresponding substantially to the circumference of the hose upon which the lever is to be used.

It will be seen that in order to apply my improved clamp it may be slipped over the end of the flexible hose before it is forced over the end of the metal pipe X, and then by applying pressure to the free end of the lever it will be forced down upon the hose and be held tightly in place by the elasticity of the hose, which applies constant tension to the clamp. It will be noted that the free end of the tie A lies below or within the fulcrum $b$ of the lever, so that tension thereon tends to draw the free end of the lever closer to the hose, which prevents the latter opening or rising. It may suffice for this purpose that the free end of the tie be engaged with the lever at any point beyond its fulcrum so long as such point does not lie too far outside the fulcrum $b$. In other words, the relation of the two points of connection between the tie and lever must be such that the tension of the tie is applied in a direction lying within rather than without the fulcrum $b$. By the provision of several hooks $b'$ on the inner side of the lever provision is made for convenient adjustment of the size or diameter of the tie to suit conditions.

It is apparent that in the application of the clamp to a hose its fulcrum end bears forcibly upon the latter. To prevent abrasion or wear of the same, as well as to prevent the lever end sinking into the hose when comparatively soft, I provide a shield C, the same consisting of a sheet-metal plate, which is made a little wider than the space between the strands of the tie, so that its side edges may be turned over the same, whereby the shield is permanently attached to the tie. The shield is applied to the end portion of the tie which is permanently connected with the lever, and it extends beneath the fulcrum end of the latter and is preferably doubled back upon itself, as shown, so as to form an effective shield or protector for the hose upon which the fulcrum end of the lever bears when being closed and opened, so that wear or indentation of the hose is prevented.

In the modification shown in Fig. 4 the metal band $A^2$ is connected with the lever E by means of a narrow tongue $a^3$, which is formed by slitting and slotting a portion of the band and turning back the tongue which is cut out on three sides, the free end of the tongue being riveted to the body of the band. The slotted end of the band projects far enough beyond the pivotal point of the lever to constitute a shield, as in the construction illustrated in Figs. 1 to 3.

What I claim is—

1. The improved hose-clamp comprising a flexible tie, a curved lever pivoted to the tie adjacent to one end of the latter and having a series of hooks on its inner side, the opposite end of the tie being provided with a loop adapted to engage such hook, and the end of the tie to which the lever is pivoted being extended beyond the point of pivotal attachment of the lever whereby it is adapted to serve as a shield in the manner shown and described.

2. The improved hose-clamp comprising a sheet-metal band having near one end a narrow tongue formed by slitting and slotting the band, such tongue being turned back and riveted, a lever pivoted to the loop formed by said tongue and adapted for engagement with the opposite end of the band, the band being extended beyond the pivotal attachment of the lever to form a shield for the hose in the manner described.

JOHN EDWARD JOHNSON.

Witnesses:
W. E. SCHULTZ,
S. G. BENTON.